United States Patent [19]

Mackechnie

[11] 3,732,410

[45] May 8, 1973

[54] SELF ADAPTIVE FILTER AND CONTROL CIRCUIT THEREFOR

[75] Inventor: Laurence Kenneth Mackechnie, Granger, Ind.

[73] Assignee: Commonwealth of Australia, C/- Postmaster-General's Department Research Laboratories, Melbourne, Australia

[22] Filed: Dec. 16, 1970

[21] Appl. No.: 98,800

[30] Foreign Application Priority Data

Dec. 22, 1969 Australia ............................65671/69

[52] U.S. Cl. ...........235/181, 179/170.2, 235/150.53, 324/57 R, 333/18, 333/28

[51] Int. Cl. ............................G06f 15/34, H04b 3/20

[58] Field of Search ....................235/181; 179/170.2; 333/18, 28

[56] References Cited

UNITED STATES PATENTS

| | | | |
|---|---|---|---|
| 3,632,905 | 1/1972 | Thomas et al. | 179/100.2 |
| 3,588,385 | 6/1971 | Moye | 179/170.2 |
| 3,535,473 | 10/1970 | Flanagan et al. | 179/170.2 |
| 3,573,667 | 4/1971 | Kao et al. | 333/28 X |
| 3,508,017 | 4/1970 | Unrue | 179/170.2 |
| 3,499,999 | 3/1970 | Sondhi | 179/170.2 |
| 3,421,141 | 1/1969 | Meyerhoff | 235/181 X |
| 3,368,168 | 2/1968 | Lucky | 333/18 |

FOREIGN PATENTS OR APPLICATIONS

| | | | |
|---|---|---|---|
| 1,184,653 | 3/1970 | Great Britain | 235/181 |

*Primary Examiner*—Felix D. Gruber
*Attorney*—Woodhams, Blanchard & Flynn

[57] ABSTRACT

A self-adaptive filter control circuit which operates to compute alterations to the impulse response of a network to alter that impulse response so that it bears a predetermined relationship to the impulse response of another network, the circuit operating to compute alterations by a process in which a first value of an error function, taken by sampling signals related to the networks and being indicative of the state of divergence of the impulse responses from the predetermined relationship, is used to compute a necessary adjustment to the impulse response of the first network, and the value of the error function is progressively reduced by computation and by successive applications of computed alterations.

25 Claims, 5 Drawing Figures

INVENTOR
LAURENCE K. MACKECHNIE
BY
Wadhams, Blanchard & Flynn
ATTORNEY

INVENTOR
LAURENCE K. MACKECHNIE
BY
Woodhams, Blanchard & Flynn
ATTORNEY

INVENTOR
LAURENCE K. MACKECHNIE
BY
Woodhams, Blanchard & Flynn
ATTORNEY

INVENTOR
LAURENCE K. MACKECHNIE
BY
Wadham, Blanchard & Flynn
ATTORNEY

SELF ADAPTIVE FILTER AND CONTROL CIRCUIT THEREFOR

BACKGROUND OF THE INVENTION i. Field of the invention

This invention relates to self-adaptive filters and to control circuits for these. Filters of this kind are used, for example, for equalization of communication channels or for cancelling "echo" signals which occur in telephone links of the kind having a four-wire transmission circuit connected to two-wire transmission circuits by "hybrids".

ii. Prior Art

A filter of this kind is described in U.S. Pat. No. 3,500,000 assigned to Bell Telephone Laboratories Inc. The present invention relates to a device of this general kind but possessing improved signal processing facilities.

BRIEF SUMMARY OF THE INVENTION

According to this invention there is provided a control circuit for a self-adaptive filter, the control circuit including means for computing an alteration to the impulse response of a filter network, the alteration being an alteration to the filter network impulse response necessary to alter an output signal from said filter network in a manner tending to conform the output signal to another signal; said means for computing an alteration comprising means for generating an error function which is a measure of the degree of conformity between the output signal from the filter network and said another signal, and means for determining or approximating the signs of partial derivatives of said error function with respect to coefficients of said impulse response; the computed alteration comprising incremental adjustments to be made to each coefficient of the impulse response of the filter network, said adjustments being determined in accordance with the determined or approximated signs of said partial derivatives for a first value of said error function and for at least one further value thereof, the or each further value being computed by said computing means and representing a modification to said error function that would exist if the preceding determinations of adjustments were effected.

The means for computing an alteration may include means for computing incremental one-step adjustments by an iterative procedure in which a set of first one-step incremental adjustments to the respective coefficients of impulse response of said filter network are computed from an initial set of coefficients of said error function and this set of adjustments to the coefficients is utilized to calculate a modified value of said error function which would result if the set of adjustments was effected, the modified value being utilized to calculate further one-step incremental adjustments to the coefficients of the impulse response of the filter network, the iteration being carried out either for a fixed period or until a modified value of the error function corresponding to a condition in which the said output signal would substantially conform to said another signal is reached.

The said error function may comprise the cross-correlation between an input signal to said filter network which results in said output signal and a difference signal being the difference between said output signal and said another signal; said means for generating said error function comprising means for computing and sampling coefficients of cross-correlation; said control circuit further including means for computing and sampling coefficients of the auto-correlation of said input signal and said means for computing said incremental one-step adjustments utilizing said auto-correlation samples together with determinations or approximations of signs of said partial derivatives, made by said means for determining or approximating the signs of partial derivatives and for the initial and modified values of error function, to compute said or each modified value of error function. Alternatively, the error function may comprise a difference signal being the difference between said output signal and said another signal, said means for generating said error function including means for sampling said difference signal; said control circuit further including means for sampling a signal being an input signal to said filter network which results in said output signal; said means for computing said incremental one-step adjustments utilizing said difference signal samples together with determinations of signs of said partial derivatives, made by said means for determining or approximating the signs of partial derivatives for the initial and modified values of error function, to compute said or each modified value of error function; said determination of signs being made from said input and output samples.

This invention also provides a self-adaptive filter including a filter network, the impulse response of which is variable, and a control circuit; said control circuit comprising means for computing an alteration to said impulse response, and means for effecting said alteration, the alteration being an alteration to the filter network impulse response necessary to alter an output signal from said filter network in a manner tending to conform the output signal to another signal; the self-adaptive filter also including means for generating a signal being the difference between said output signal and said another signal; said means for computing an alteration comprising means for generating an error function which is a measure of the degree of conformity between said output signal and said another signal, and means for determining or approximating the signs of partial derivatives of said error function with respect to coefficients of said impulse response; said means for effecting an alteration being arranged to alter the coefficients of impulse response to effect said computed alteration; the computed alteration comprising incremental adjustments to be made to each coefficient of the impulse response of the filter network, said adjustments being determined in accordance with the determined or approximated signs of said partial derivatives for a first value of said error function and for at least one further value thereof, the or each further value being computed by said computing means and representing a modification to said error function that would exist if the preceding determinations of adjustments were effected.

BRIEF DESCRIPTION OF THE SEVERAL VIEWS OF THE DRAWING

The invention is now described in detail with reference to the accompanying drawings in which.

DETAILED DESCRIPTION

Figure 1:
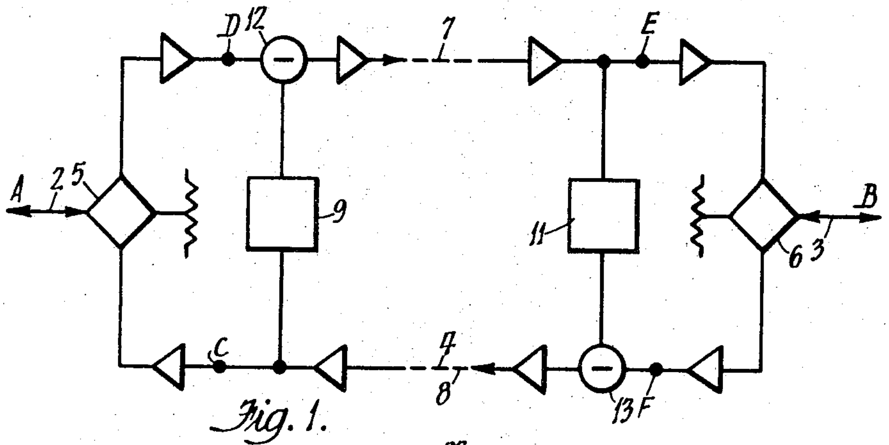
FIG. 1 is a schematic diagram illustrating generally the manner of utilization of the self adaptive filter of the invention as an echo canceller.

FIG. 1 shows the circuit diagram of a telephone circuit between two parties A and B. The circuit comprises two two-wire telephone circuits 2, 3 which are connected to a four-wire carrier circuit 4 by means of a pair of hybrids 5, 6. When caller A speaks, hybrid 5 channels the outgoing voice signal on line 2 to the upper path 7 of four-wire transmission circuit 4 and thence to hybrid 6 which channels the voice signal along two-wire path 3 to party B. Similarly, when party B talks hybrid 6 channels the voice signal to the lower transmission path 8 of transmission circuit 4 to hybrid 5 which then channels the voice signal through line 2 to party A. Under ideal conditions no signal will circulate within the four-wire transmission circuit, and specifically, no signal will travel through hybrid 5 from point C to D or through hybrid 6 from points E to F. It is well known that in order to accomplish this, the complex impedance of the hybrids as presented to the incoming signals must be exactly equal to the complex conjugate of the associated line impedance. In practice, such a situation is often impossible to achieve since the impedances of the lines vary from time to time so that the matching impedances of the hybrids would need to be continuously modified to accomodate these changes.

If matching of the hybrids to the lines is not perfect, signals will travel through hybrid 5 from points C to D and through hybrid 6 from points E to F. Thus if one party talks his signal will return to him after some delay and after traversing the entire loop represented by four-wire circuit 4. If the delay is short, the returning signal will not be heard as a distinct signal by the caller, but if it is long a distinct echo will be heard. These echoes can seriously degrade the quality of transmission and it is desirable that they be eliminated. In cases where four-wire transmission circuit 4 is very long, such as where a satellite link is utilized, it is, in fact, practically essential that the echo be minimized if the transmission line is to be workable.

Various methods have hitherto been devised for overcoming this problem and one approach has been to utilize devices known as echo cancellers, which are indicated in FIG. 1 by the reference numerals 9 and 11. These are arranged so that they are connected across the appropriate hybrids and are adapted to apply through difference networks 12 and 13 signals which are the inverse of the echo signals. The connection of the cancellers across the hybrids may be direct, the echo cancellers being close to the hybrids. Alternatively, the echo cancellers could be remote from the hybrids and connection made by way of carrier links. Thus a signal traversing from point F to point C and originating from caller B is sensed by canceller 9 which computes the form of the signal resulting from this call signal which will pass from points C to D through hybrid 5 and reconstructs such a signal, the negative of this signal then being applied at the side D of the hybrid to cancel the echo. Since the characteristics of the transmission paths vary, the cancellers 9 and 11 are required to adapt continuously to such variations.

The relationship between the input signals $x(t)$ to hybrid 5 and the residual signal $y(t)$ is given by $$y(\tau)=\lim_{T'\to\infty}\int_{-T'}^{T'} x(\tau-t)\cdot h(t)\cdot dt \qquad 1(a)$$

where $h(t)$ is a residual impulse response between points C and D in FIG. 1 and $h(t)=\hat{r}(t)-r(t)$ where $r(t)$ is the actual "trans-hybrid" impulse response and $\hat{r}(t)$ is the impulse response of the echo canceller. If the input signal $x(t)$ is assumed stationary and ergodic the relationship between its auto correlation $A_{xx}(\tau)$, and the cross-correlation $C_{xy}(\tau)$ is:

$$C_{xy}(\tau)=\lim_{T'\to\infty}\int_{-T'}^{T'} A_{xx}(\tau-t)\cdot h(t)\cdot dt \qquad 1(b)$$

where $$A_{xx}(\tau)=\lim_{T'\to\infty}\int_{-T'}^{T'} x(t)\cdot x(t+\tau)dt$$

If the signals are band-limited so that the Nyquist interval equals T and the residual impulse response $h(t)$ is assumed negligible beyond time MT (M integer and T<<T') equations 1(*a*) and 1(*b*) may be approximated in the following form:

$$\begin{bmatrix}\epsilon_0\\ \cdot\\ \cdot\\ \cdot\\ \epsilon_M\end{bmatrix}=\begin{bmatrix}f_0\\ \cdot\\ \cdot\\ \cdot\\ f_M\end{bmatrix}-\begin{bmatrix}g_0 & g_{-1} & g_{-2} & \cdots & g_{-M}\\ g_1 & g_0 & g_{-1} & \cdots & g_{-M+1}\\ \cdot & & & & \cdot\\ \cdot & & & & \cdot\\ g_M & g_{M-1} & \cdots & \cdots & g_0\end{bmatrix}\begin{bmatrix}w_0\\ \cdot\\ \cdot\\ \cdot\\ w_M\end{bmatrix} \qquad 2.$$

Equations 2 and 1(*a*) may be related by putting $f_k=y(kT)$, $g_{k+n}=x(kT-nT)$ and $w_n=\Delta\hat{r}(nT)$. Equations 2 and 1(*b*) may be related by putting $f_k=C_{xy}(kT)$, $g_{k-n}=A_{xx}(kT-nT)$ and $w_n=\Delta\hat{r}(nT)$, where $\Delta\hat{r}(nt)$ represents an estimate of the residual trans-hybrid impulse response, $h(t)$. Thus $\underline{\epsilon}$ is a measure of the accuracy of the estimate in both cases.

It is possible to measure $\underline{F}$ and $\underline{G}$, and $\underline{W}$ is unknown. It is required to establish the condition $\epsilon=0$ for echo cancellation. It is necessary therefore to determine $\underline{W}$ such that $$\epsilon_n=0(0\le n\le M)$$

Note that a bar under a mathematical symbol is used (e.g. $\underline{\epsilon}$) to indicate a matrix.

It can be shown that both modulus and quadratic error functions defined in the following equations 3(*a*) and 3(*b*) are convex.

$$E = \sum_{k=0}^{M} \epsilon_k^2 \quad 3(a)$$

$$E = \sum_{k=0}^{M} \left| \epsilon_K \right| \quad 3(b)$$

where $$\epsilon_k = f_k - \sum_{n=0}^{M} g_{k-n} \cdot w_n$$

Because of this convexity a steepest descent approach may be adopted to determine a minimum of the error function.

The appropriate derivatives are given by equations 4(*a*) (quadratic) and 4(*b*) (modulus).

$$\frac{\partial E}{\partial w_j} = -2. \sum_{k=0}^{M} g_{k-j} \cdot \epsilon_k \quad 4(a)$$

$$\frac{\partial E}{\partial w_j} = -\sum_{k=0}^{M} g_{k-j} \cdot \text{sign}\ (\epsilon_k) \quad 4(b)$$

It will be seen that, after making initial estimates of W (e.g. $w_n = o$, all $n$) the global minimum of the error function may be reached by successive iterations of the $w_j$ in the directions indicated by the derivatives. Thus, by computing auto and cross correlations, or by simply collecting samples of the input $x(t)$ and output $y(t)$, information can be extracted from the signal to enable either the cross correlation between the input and output, or the output directly, to be forced to a minimum. In both cases the echo is effectively cancelled.

It has been ascertained that, when reducing the cross-correlation to zero the derivatives need not be calculated because each derivative sign is equal, in most cases, to the corresponding sign of the cross correlation, and the derivative sign contains sufficient information for convergence. When forcing the output to zero directly it has been ascertained that it is necessary to calculate the derivatives for satisfactory performance.

Figure 2:
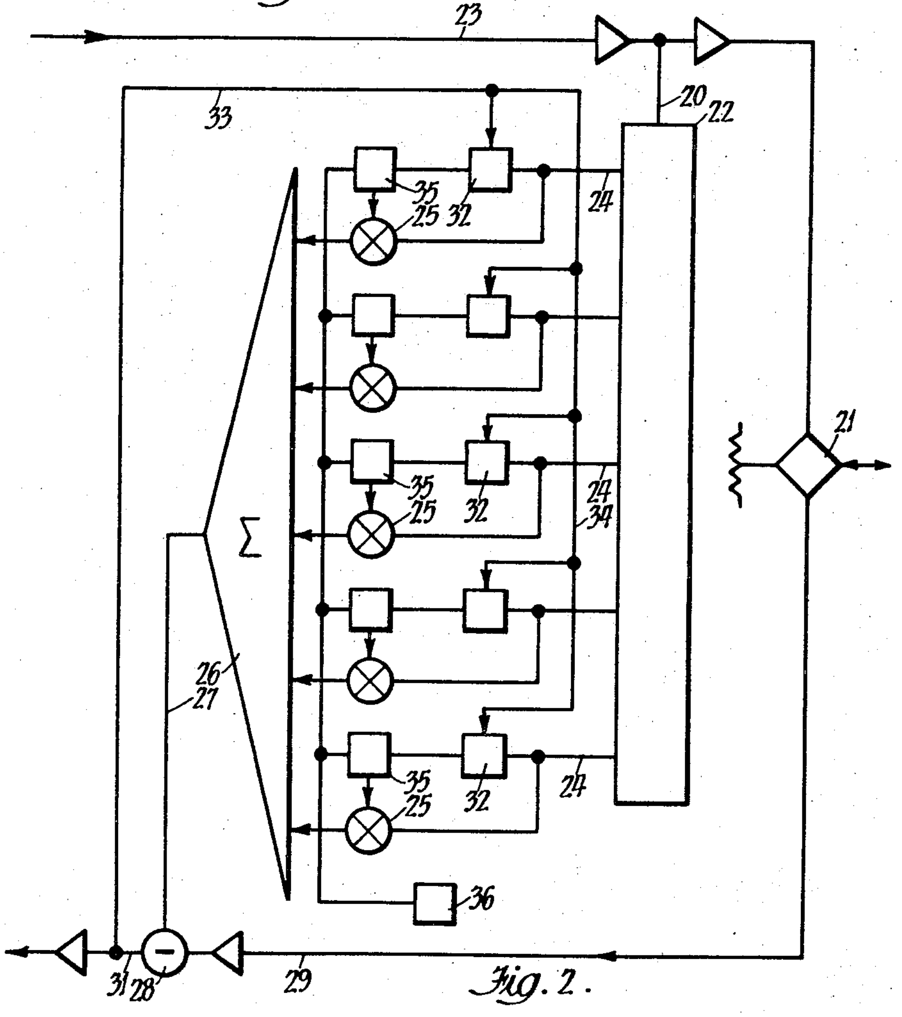
FIG. 2 is a schematic diagram of a first embodiment of the invention, and comprising an echo canceller.

A first embodiment of the echo canceller in accordance with the invention is shown in FIG. 2 and this operates by determining correlation between the input and output signals to a hybrid 21. The echo canceller comprises a delay line 22 having an input 20 connected to the input line 23 to a hybrid 21 and also having a plurality of tapped outputs 24. The delay line reproduces at the outputs 24, and at time lags $nT$, replicas of the input signal on line 23. The outputs are fed through multipliers 25 and are summed in summation network 26. The combined output is taken by line 27 to a difference network 28 which network is connected also to the output line 29 from hybrid 21. Difference network 28 produces a signal on output line 31 which is the difference between the signals on lines 29 and 27. It will be seen that delay line 22 together with the multipliers 25 and summation circuit 26 thus produce, from the input on line 23, an output the inverse of which is supplied to the output of hybrid 21.

The outputs 24 of the delay line are also each connected to separate correlators 32. The output from hybrid 21 on line 31 is connected to the correlators 32 by means of lines 33, 34. Each multiplier has an associated control circuit 35. A logic circuit 36 is connected to the control circuits 35. The correlators 32 utilize analog multipliers which continuously compute cross-correlation coefficients for the various delays $nT$, the necessary integration being carried out over successive time periods $T_i$. At the end of each period $T_i$ the value of the cross-correlation is sampled by the control circuits 35 and the gain of the associated multipliers 25 are incremented by an increment $\Delta\hat{r}$. The direction of incrementation of each multiplier is determined by the sign of the associated cross-correlation coefficient, and applied to the associated control circuit 35 when directed by control pulses from circuit 36.

Thus, for each set of samples of correlation coefficients, the output from multipliers 25 are incremented one step, and after repeated incrementation, the impulse response of delay line 22 will adequately approximate the trans-hybrid impulse response of hybrid 21. The magnitude of the incremental adjustments from multipliers 25 must be small enough to minimize interaction between tapped outputs 24 and to produce a low residual error in $\hat{r}$ as compared with $r$. The increments must also be large enough to allow fast tracking of changes in the characteristics of the transmission circuit. Each increment may thus correspond to 0.25 percent of the maximum impulse response coefficient setting.

The above described embodiment requires that computation of the cross-correlation coefficients be effected with a high degree of accuracy and highly linear multipliers with a large dynamic range are required to perform the necessary multiplications. A suitable multiplier is described in U.S. Pat. No. 3,629,567, (Bruggemann) entitled "Analogue Multiplier", issued Dec. 21, 1971.

Whilst the above described embodiment will perform satisfactorily convergence is relatively slow. Accordingly, relatively rapid changes in channel characteristics may not be adequately tracked.

Figure 3:
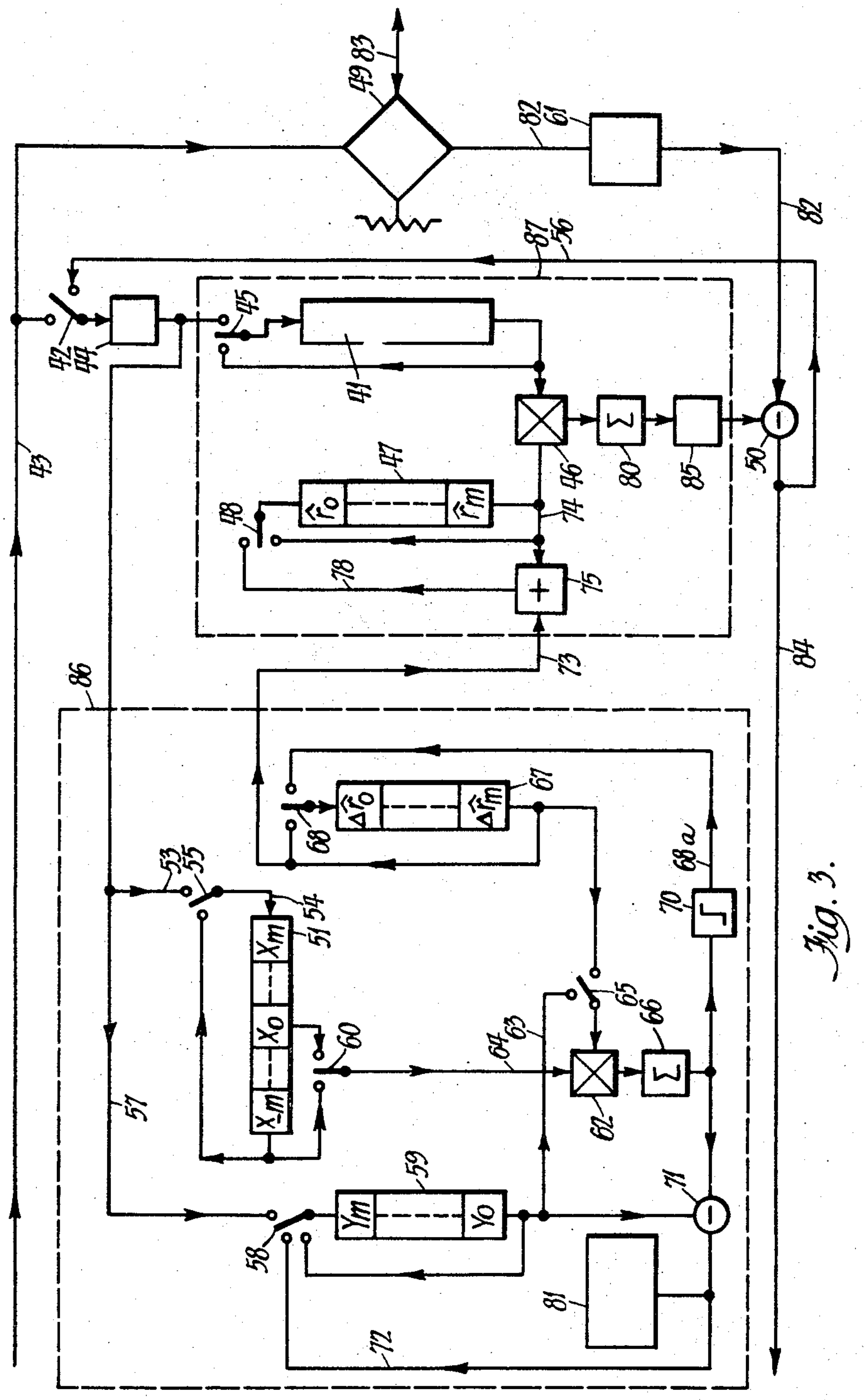
FIG. 3 is a schematic diagram for a second embodiment of the invention, also comprising an echo canceller.

FIG. 3 shows an improved form of echo canceller constructed in accordance with the invention. Whilst the arrangement described in the preceding paragraph utilizes analogue circuitry this arrangement is digital. Further, instead of using cross-correlation between the input and output for determining the existence of differences between the impulse response of the hybrid and delay line, the differences are computed from the convolution relationship between the input and output. This embodiment also possesses means for more adequately processing each sample of the input and output in order to provide speedier convergence.

The arrangement utilizes a delay line which is in the form of a shift register 41. By means of switch 42, incoming signal on line 43 is sampled at intervals T and fed to analogue to digital converter 44. The digitized samples are then fed into shift register 41 via switch 45. The delay line is able to accommodate (M + 1) samples. After one sample has been fed into shift register 41, the shift register is rapidly circulated M + 1 times (with switch 45 appropriately switched) and the outputs fed through multiplier 46. Comittently, impulse response coefficients $\hat{r}_o \ldots \hat{r}_M$, which are stored in a coefficient store shift register 47, are fed to multiplier 46. The coefficient store shift register is circulated during this operation with switch 48 appropriately positioned. The arrangement of the pairing of the outputs from the two shift registers 47 and 41 is such that multiplier 46 produces output components $\hat{Y}_i$ in the following form:

$$\hat{Y}_i = x_i \hat{r}_o + x_{i-1} \hat{r}_1 \ldots + x_{i-M} \hat{r}_M \qquad (5)$$

where $x_i \ldots x_{i-M}$ are the stored samples of input signal in register 41.

The components of each summation accumulate in summation circuit 80 and when the summation for each component $\hat{y}_i$ is complete, the component is converted to analogue form by digital-to-analogue converter 85 and applied to the output line from hybrid 49 via difference network 50 in the same manner as in the preceding embodiment. It will be seen that the operation of the section of the circuit within dashed line 87 and which constitutes the echo simulator is in essence merely a digital equivalent of the delay line, multipliers and summation network 26 of the preceding embodiment.

The digitized samples of input voltage on line 43 which are fed to the delay line register 41 are simultaneously fed into an input sample store 51 via lines 52, 53, 54 and switch 55. Corresponding output voltages on line 84 are also sampled by switch 42 through line 56, and these are fed to analog-to-digital converter 44 and thence along lines 57, 58 to output sample store 59. It will be appreciated that samples of output and input voltage at corresponding times are required and since the samplings are performed by a single switch 42, a delay 61 is inserted in the output line 82 from hybrid 49 between the hybrid and difference network 50.

The input and output sample stores 51 and 59 are in the form of shift registers, the output store containing M + 1 samples and the input sample store containing 2M + 1 samples.

When a new set of samples of input and output are fed to stores 51 and 59, a computation of necessary alterations to the corresponding coefficients of the impulse response of the delay line is carried out. In order to do this, it is first necessary to calculate a gradient $(\delta E/\delta \hat{r})$ (in accordance, with equations 4(*a*) in the case). To do this, the outputs of stores 51 and 59 are connected to a multiplier 62 via lines 63, 64 and a switch 65. The stores 51 and 59 are then circulated so that each derivative is calculated serially. It will be seen that each derivative calculation involves (M + 1) multiplications made in the following manner $$\begin{array}{cccccccc} \frac{\partial E}{\partial \hat{r}_o} & & x_o & x_1 & \cdots\cdots & x_M & 2y_o & \\ \frac{\partial E}{\partial r_1} & = & x_{-1} & x_o & \cdots\cdots & x_{M-1} & 2y_1 & (6) \\ \cdot & & \cdot & \cdot & & \cdot & \cdot & \\ \cdot & & \cdot & \cdot & & \cdot & \cdot & \\ \cdot & & \cdot & \cdot & & \cdot & \cdot & \\ \cdot & & \cdot & \cdot & & \cdot & \cdot & \\ \frac{\partial E}{\partial \hat{r}_M} & & x_{-M} & x_{-M+1} & & x_o & 2y_M & \end{array}$$

The individual components of the derivatives appear at the output of multiplier 62 and are accumulated by summation network 66. As the summed components of each derivative become available, the sign of the derivative is read by network 70 and the corresponding increment value of $\Delta\hat{r}$ fed to the impulse response increment shift register 67; the sign of the increment being indicated by the sign of the derivative. This is accomplished via line 68A. Before taking further samples $x(t)$, $y(t)$ revised values of output Y' are computed in accordance with the equation:

$$\underline{Y}' = \underline{\epsilon}' = \underline{X}.[\underline{H} - \Delta \hat{\underline{R}}] = \underline{Y} - \underline{X}.\Delta \hat{\underline{R}} \qquad (7)$$

$$\text{i.e. } y'_k = y_k - \sum_{k=0}^{M} X_{k-n} \Delta \hat{r}_n$$

These modified values, Y, represent the value of output which would have occurred if the coefficients $r_o \ldots r_M$ of the impulse response of the delay line were to have been modified in accordance with the just computed increments. To perform the computations, the input coefficient store 51 and the impulse response increment store 67 are connected to multiplier 62 by means of lines 64, 66 and switches 60, 65. The components $x.\Delta\hat{r}$ corresponding to each value of $y$ are accumulated in network 66 and then subtracted from the corresponding $y$ value in subtractor network 71 to produce the value $y'$ which is fed into shift register 59 via line 72 to replace the corresponding value of $y$. At this point, the values $\Delta\hat{r}$ in register 67 are transferred to register 47 to update $\underline{R}$.

Now, by using the revised values $y'$ in place of the values of $y$ in equation 4(*a*), the derivatives $(\delta E/\delta \hat{r})$ are recomputed in the same manner as the first computation and corresponding new incremental adjustments $\Delta\hat{r}$ are fed to register 67 to replace the previously computed incremental adjustments. From the re-computed $\Delta\hat{r}$ values, further revised values of output are calculated and the iteration continued until the coefficients of $\underline{R}$ corresponding to minimum output are obtained or at least until sufficient information has otherwise been extracted. The coefficients of $\Delta\hat{\underline{R}}$ in store 67 are added to the corresponding coefficients of $\underline{R}$ in store 47 after each computation by circulating the stores 47 and 67 and adding the corresponding outputs through lines 73 and 74 at additive circuit 75. The new coefficients of $\hat{\underline{R}}$ are then inserted into register 47 via line 78 and switch 48.

It will be seen that, for each new set of samples of input and output fed into the shift registers 51 and 59 the coefficient values of $\hat{\underline{R}}$ may be incremented in a manner which will provide substantially complete convergence for the frequencies which are present in the input signal. Thus, changes in the coefficients $r_o \ldots r_M$ of the four-wire circuit can be tracked providing these changes occur at rates which are slow when compared with the computation time. The number of multiplications performed for each new set of samples of input and output is great but having taken one set of samples, the convergence time is limited only by the speed of the control circuit 86, this speed being limited only by the speed of operation of the devices comprising the control circuit. In the embodiment of FIG. 2, many correlations may be required before convergence can be effected and this places a fundamental limitation upon the convergence speed. This arises because, in practice, to achieve satisfactory performance, each correlation must be computed over a time comparable with the time taken by the arrangement of FIG. 3 to process a set of samples and achieve substantially complete convergence.

The arrangement of FIG. 3 includes a monitoring circuit 81 which sums the squares of the coefficients of output in register 59 at the end of each computation of $\Delta\hat{r}$ increments and is arranged to compare the error for each calculation to test whether convergence was achieved. The circuit could also be provided with means for varying the stepping increments $\Delta\hat{r}$, in accordance with the convergence determination. It will be appreciated that the monitoring circuit could be arranged to merely add moduli of the coefficients in register 59 so that the presence of an error is determined in accordance with equation 3(*b*) rather than in accordance with equation 3(*a*).

Figure 4:
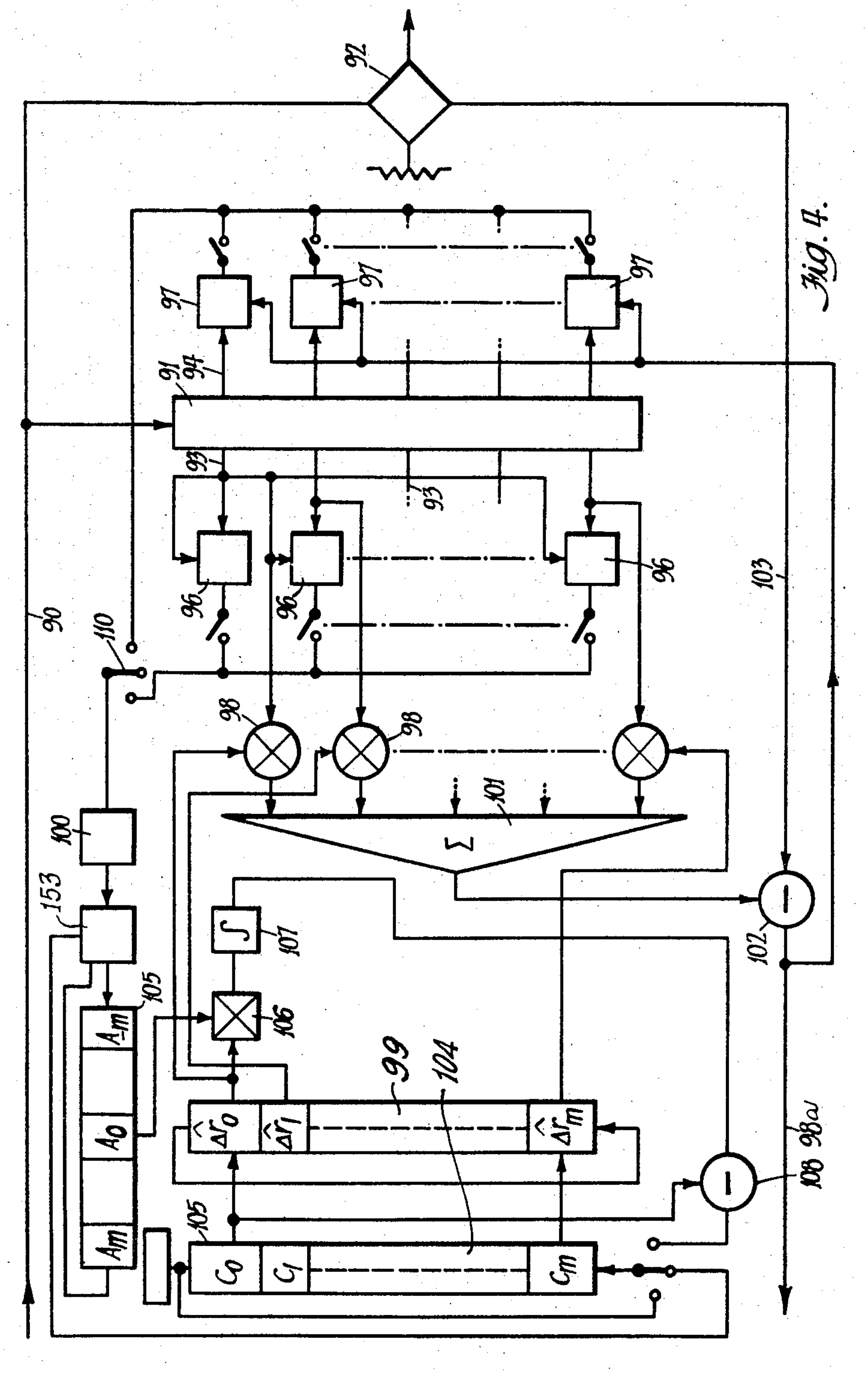
FIG. 4 is a schematic diagram of a third embodiment of the invention, also comprising an echo canceller.

FIG. 4 shows a further embodiment of echo canceller constructed in accordance with the invention. It functions in a manner analogous to the last described embodiment, but utilizes cross-correlation as the error function rather than the output signal itself. The arrangement comprises a delay line 91 having its input connected to the input on line 90 to hybrid 92 and having a plurality of tapped outputs 93, 94.

The arrangement includes a plurality of auto-correlators 96 which incorporate high precision analogue multipliers and compute the auto-correlation coefficients between signals on the various delay line outputs 93 and the (delayed) incoming signal from line 90. A plurality of cross-correlators 97 are also provided and these compute cross-correlation coefficients between the outgoing signal on line 98A and the various delayed input signals on delay line outputs 94.

The outputs 93 from delay line 91 are also connected to multipliers 98. These multipliers multiply the various delayed outputs $x_o \ldots x_M$ from the delay line by the corresponding impulse response coefficients $\hat{r}_o \ldots \hat{r}_M$ held therein. This multiplication is the same as that represented by equation (5). The outputs $\hat{y}_i$ from the multipliers are fed to summation network 101 and the summed outputs are subtracted from the output from hybrid 92 on line 103 by difference network 102.

The outputs of cross-correlators 97 and auto-correlators 96 are sampled via switch 110. The coefficient values for each sampling are converted to digital form by analog-to-digital converter 100 and fed by a switch 153 to shift registers 104 (cross-correlation coefficients) and 105 (auto-correlation coefficients), the switch 153 being connected as seen in FIG. 4 for recirculating coefficients through shift register 105, feeding coefficients to shift register 105 or feeding coefficients to shift register 104. It will be noted that shift register 105 is required to store (2M + *l*) samples of auto-correlation whereas there are but (M + 1) auto-correlators. However since the auto correlation $A_{xx}(\tau)$ is equal to the auto-correlation $A_{xx}(-\tau)$ these M + 1 samples are sufficient.

In this case, it is not necessary to directly compute the derivatives $(\delta E/\delta\hat{r})$; the values of impulse response coefficient modifications $\Delta\hat{r}$ fed to register 99 are made merely in accordance with the sign of the corresponding cross-correlation values.

After a first incrementation, computation of modified coefficient values $C'_k$ of cross-correlation are computed in accordance with the following equation:

$$C' = A.[H - \Delta\hat{R}] = [C] - [A.\Delta\hat{R}] \qquad 7(b)$$

$$\text{i.e. } C'_k = C_k - \sum_{k=0}^{M} A_{k-n} \cdot \Delta\hat{r}_n \qquad 7(c)$$

For example, to calculate $C'_o$, the first term in the summation of equation 7(*c*), $(A_o.\Delta\hat{r}_o)$ is calculated by multiplier 106 by circulating registers 99, 105 in the positions shown in FIG. 4. This value is stored in the integrator 107, and registers 99, 105 are shifted by one bit and the second term $(A_{-1}.\Delta\hat{r}_1)$ is calculated and added to integrator 107. The summed terms are then fed, together with the corresponding $C_o$ value to subtractor 108 to produce $C'_o$ which is shifted into register 104. $C'_1$ is calculated in a similar way after shifting register 105 by one bit to bring $A_1$ initially in line with the input to multiplier 106. Each $C'_j$ is computed in a like manner and is stored in register 104. The $[\Delta\hat{r}]$ values are added to the delay line coefficients after the initial computation and again after each computation of updated C' values; this process being repeated until the delay line coefficients oscillate about an optimum set of values. A new set of samples [C] and [A] are then taken from the correlator outputs via converter 100 and the above-described procedure is repeated.

It will be appreciated that the last two described arrangements could be modified to utilize analogue circuitry. In the case of the arrangement of FIG. 4 for example, shift registers 104, 105 could be replaced by analogue hold circuits which would be directly connected to the outputs of the auto- and cross- correlators 96, 97, thus dispensing with switch 110 and the converter 100. Instead of using a shift register technique an electronic switch would scan the output of the hold circuits and appropriately feed the inputs to an analog multiplier. The output of the analog integrator and subtractor would supply the newly calculated values of C' which would be switched to directly replace the appropriate values of C rather than being fed into the shift register 104. The intermediate store $[\Delta\hat{r}]$ may of course also be readily realized in analog form.

It will also be appreciated that the circuit arrangements of FIGS. 2 and 4 could easily be modified to incorporate the delay line shift register shown in FIG. 3 and to effect digital computation of cross-correlation and in the case of the FIG. 4 arrangement digital computation of auto-correlation. Likewise, the arrangement of FIG. 3 could readily be modified to incorporate the delay line of FIG. 4. This arrangement could also be directly modified to operate by determining and sampling cross-correlation and auto-correlation, and computing the gradients $(\delta E/\delta \hat{r})$ according to the relationship:

$$\frac{\partial E}{\partial \hat{r}_j} = -2\sum_{k=0}^{M} A_{k-j} \cdot C_k \qquad (9)$$

Figure 5:
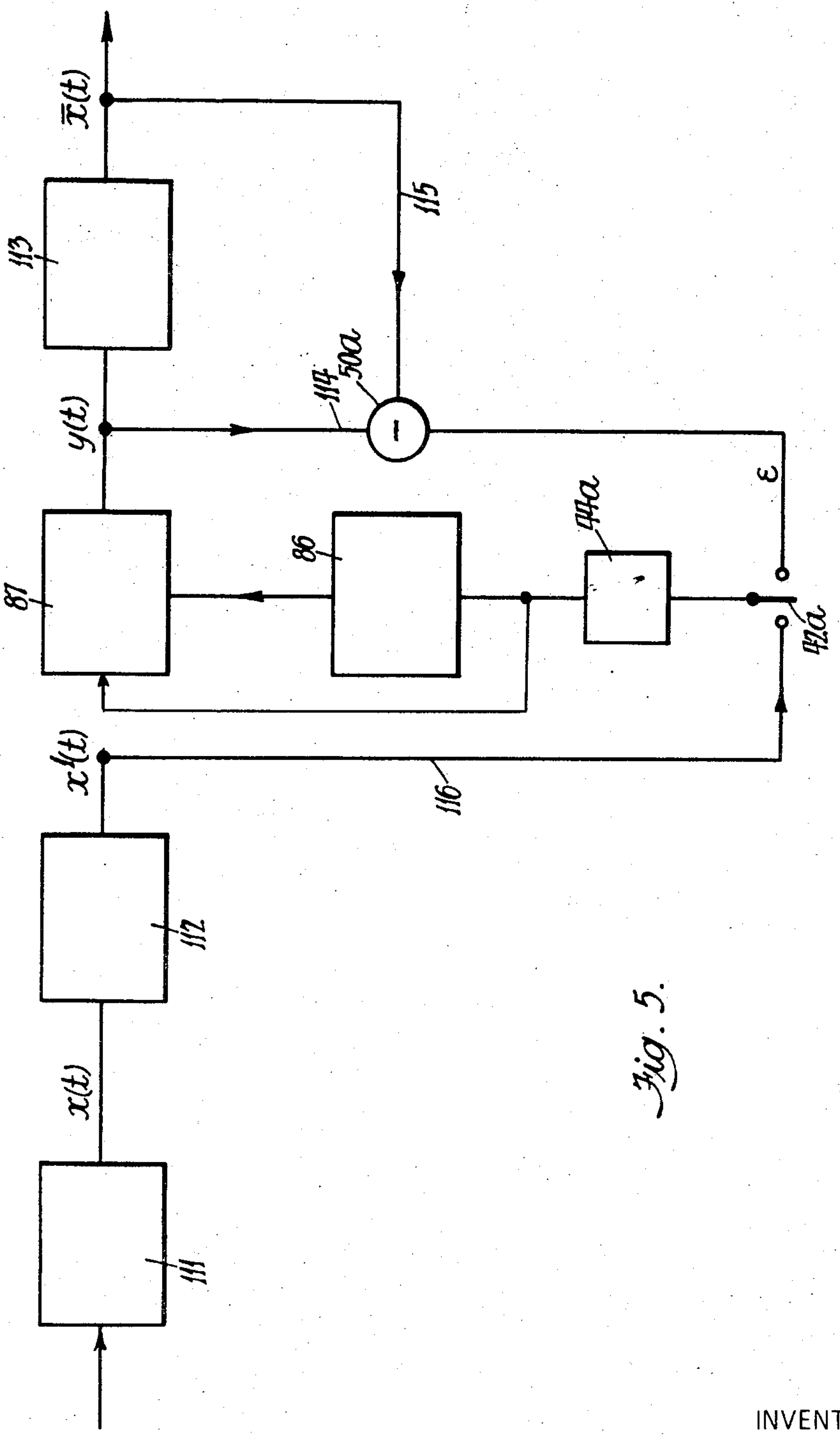
FIG. 5 is a schematic diagram showing the manner of use of an adaptive filter constructed in accordance with the invention as an adaptive equalizer.

FIG. 5 shows schematically the manner of use of an adaptive filter constructed in accordance with the invention for adaptive equalization of a transmission channel 112. The arrangement of the filter follows that of FIG. 3 and the portions 86 and 87 of the filter correspond to those parts of the filter of FIG. 3 which are within dashed boxes 86, 87 respectively. Reference numeral 87 in FIG. 5 thus represents the equalizing filter network and reference numeral 86 represents the control circuitry for network 87.

The purpose of the equalizer constituted by portions 86, 87, is to equalize the response of channel 112. To do this the equalizer filter network 87 must present an impulse response $H^e$ which is the inverse of the impulse response $H^c$ of channel 112. This condition corresponds to a case where all but one of the coefficients $h_j^R$ of the combined impulse response of channel 112 and network 87 are zero.

Signals $x(t)$ generated by transmitter 111 are fed to line 112 and the output $x'(t)$ from the channel passed through equalizer network 87 and thence through a detector 113 which converts the signal received into its original form before transmission. The output from network 113 is designated $\bar{x}(t)$.

For correct equalization the output signal $y(t)$ from the equalizer should equal the signal $x(t)$ and the difference $y(t) - x(t)$ is thus representative of the error in adjustment of the equalizer network 87. The signal $x(t)$ will not normally be available at the receiving end of channel 112 but since the signal $\bar{x}(t)$ will, under practical operating conditions, very accurately represent $x(t)$, it is here used instead of $x(t)$. Accordingly, the signals $\bar{x}(t)$ and $y(t)$ are fed to subtractor 50*a* by lines 114, 115 to produce the signal $y(t) - \bar{x}(t)$. Samples of this difference signal and samples of input $x'(t)$ to network 87 are taken by switch 42*a* and converted to digital form by converter 44*a*. The samples are fed to shift registers in control circuit 86; the $x'(t)$ samples being fed to a shift register corresponding to register 51 in FIG. 3 whilst the $y(t) - \bar{x}(t)$ samples are fed to a register corresponding to register 59 in FIG. 3. Computations of modifications to the impulse response coefficients $h^e_j$ of the equalizer network are then computed in an analogous manner to that in which the corresponding coefficients were computed in the arrangement of FIG. 3. However, in this instance the error function will be represented by $y(t) - \bar{x}(t)$ and the partial derivatives $(\delta E/\delta h^e_j)$ are calculated from the following relationship:

$$\frac{\partial E}{\partial h^e_j} \approx 2 \sum_{k=0}^{M} (y_k - \bar{x}_{k-D})\, x'_{k-j} \qquad (10)$$

where D is an integer designating the coefficient $h^R_D$ which is required to be non zero.

The computation of modified values of error function coefficients are computed from the relationship $$[\epsilon'] \approx [\epsilon] + [X' . \Delta H^e] \qquad (11)$$

where $\epsilon_k \approx Y_k - \bar{x}_{k-D}$.

While this adaptive equalizer operates in a manner analogous to the echo canceller of FIG. 3 it will be appreciated that any of the other described embodiments of echo canceller could be adapted to the purpose of channel equalization.

The self adaptive filter of the invention provides a means whereby changes in the characteristics of the circuit to which adaptation is being effected may be tracked relatively quickly. For example, in the case of the echo canceller of FIG. 3, changes in the trans-hybrid impulse response may be tracked even when these changes occur at several Hertz. Changes of this frequency may, in practice, be encountered where the connection between the subscriber and the associated echo canceller includes a carrier system which is unsynchronized.

The speed of operation of the arrangement of FIGS. 3, 4 and 5 is, as mentioned previously, determined by the computation speed of the control circuit. Because this speed is limited, many possible samples are "lost"; that is to say during the period where iteration is taking place no new samples are taken. Thus by increasing the iteration speed, it would be possible to further increase the tracking speed of these arrangements.

The described embodiments of the invention are each able to achieve satisfactory convergence where the input signal is in the form of a speech signal, so that the need to inject special test signals into the associated circuits is avoided. Such test signals are required for effective utilization of many prior self-adaptive filters.

Also, because of the relative speed with which convergence can be achieved in the embodiment of FIGS. 3 to 5, it would be possible, in some cases, to utilize a single control circuit 86 to control several networks 87 in different external circuits with consequential economic advantages.

It is to be understood that the described applications of the adaptive filter of the invention are not exhaustive, and that the filter may be utilized for a wide variety of purposes.

It is also to be understood that the described embodiments of this invention have been advanced merely by way of explanation and modification may, of course, be made to these embodiments. For example, whilst, in each described embodiment, the filter network comprises a tapped delay line, other realizations may be equally applicable. This, and many modifications may be made without departing from the spirit and scope of the invention which includes every novel feature and combination of features herein described.

I claim:

1. A method for altering the co-efficients of impulse response of a filter network so as to alter an output signal from the filter network, resultant from application of an input signal thereto, in a manner tending to conform said output signal to another signal, comprising the steps of:

generating and storing, in an error function store, a set of first error function co-efficients, said first error function co-efficients together comprising an error function representative of an existing degree of conformity between said another signal and said output signal;

generating and storing, in a control function store, a set of control function co-efficients, said control function coefficients together comprising a control function representative of said input signal;

determining a plurality of sets of incremental changes to each said co-efficient of impulse response by the steps of a. determining a first set of said incremental changes, said first set consisting of one change for each said coefficient of impulse response, each said change of said first set being determined at least substantially in accordance with the signs of corresponding partial derivatives of said error function, b. determining at least one set of modified error function co-efficients by modifying the last preceding coefficients stored in said error function store in accordance with modifications computed from the last-determined set of changes in said impulse response coefficients and from the stored control function coefficients and representing modifications which would have occurred if each previously computed set of changes had been effected and if the input signal had still been as represented by said control function coefficients, c. determining at least one subsequent set of said incremental changes, each subsequent set comprising a change to each coefficient of impulse response, said changes of each said subsequent set of changes being determined at least substantially in accordance with at least the signs of corresponding coefficients of a separate corresponding modified error function represented by the last determined set of modified error function co-efficients stored in said error function coefficient store, and, applying said incremental changes of each said set to the coefficients of impulse response to effect said alteration.

2. A method as claimed in claim 1, wherein said step of generating and storing, in an error function store, comprises the steps of sampling a difference signal at time-spaced intervals over a predetermined period to produce first difference signal samples, said difference signal being the difference between said another signal and said output signal, and storing said first difference signal samples, said first difference signal samples comprising said set of first error function co-efficients and each said set of modified error function co-efficients comprising a separate set of modified difference signal samples and said step of generating and storing, in a control function store, comprises the steps of sampling said input signal at time-spaced intervals over a period substantially corresponding to said predetermined period to produce input signal samples, and storing said input signal samples in said control function store, whereby said input signal samples comprise said control function coefficients.

3. A method as claimed in claim 2, wherein said first set of changes id determined by a. computing partial derivatives of said error function with respect to said co-efficients of impulse response in accordance with the following equation:

$$
\begin{array}{llllll}
\frac{\partial E}{\partial \hat{r}_0} & x_0 & x_M & \cdots\cdots & x_M & 2y_0 \\
\frac{\partial E}{\partial \hat{r}_1} & x_{-1} & x_0 & \cdots\cdots & x_{M-1} & 2y_1 \\
\cdot & \cdot & \cdot & & \cdot & \cdot \\
\cdot & \cdot & \cdot & & \cdot & \cdot \\
\cdot & \cdot & \cdot & & \cdot & \cdot \\
\frac{\partial E}{\partial \hat{r}_M} & x_{-M} & x_{-M+1} & & x_0 & 2y_M
\end{array}
$$

where $(\delta E/\delta \hat{r}_o)$ ...... $(\delta E/\delta \hat{r}_M)$ are the said partial derivatives, $x_o$ ...... $x_M$ are said input signal samples and $y_o$ ...... $y_M$ are said difference signal samples, and b. reading the signs of said partial derivatives, and each said further set of changes is determined by repeating said computing and said sign reading using the last computed modified difference samples in place of said first difference samples.

4. A method as claimed in claim 3, wherein said step of modifying the last preceding co-efficients stored in said error function store comprises the step of subtracting said modifications from said last preceding coefficients, said modifications being coefficients of the matrix product $\underline{X}.\Delta\hat{\underline{R}}$ where $\underline{X}$ is the matrix of said input signal samples and $\Delta\hat{\underline{R}}$ is the matrix of the last-determined set of changes to said impulse response co-efficients.

5. A method as claimed in claim 1, wherein said step of generating and storing, in an error function store, comprises the steps of generating electrical signals representing coefficients of crosscorrelation between said input signal and a difference signal, said difference signal being the difference between said another signal and said output signal, sampling said electrical signals to provide a first set of cross-correlation coefficient samples, and storing this first set of cross-correlation samples in said error function store whereby said first set of cross-correlation samples comprise said set of first error function coefficients and each said set of modified error function coefficients comprise a set of modified cross-correlation coefficients, and wherein said step of generating and storing in a control function store comprises the step of generating electrical signals representing coefficients of auto-correlation of said input signal, sampling the last-mentioned signals to provide auto-correlation samples, and storing the auto-correlation samples in said control function store, whereby said auto-correlation samples comprise said control function coefficients.

6. A method as claimed in claim 5, wherein said first set of changes is determined by the step of reading the signs of cross-correlation samples of said first set thereof and each said further set of changes is determined by reading the signs of the last computed set of modified cross-correlation samples.

7. A method as claimed in claim 6, wherein said step of modifying the last preceding coefficients stored in said error function store comprises the step of subtracting said modifications to said last preceding coefficients, said modifications being computed as coefficients of the matrix product $\underline{A}.\Delta\hat{\underline{R}}$ where $\underline{A}$ is the matrix of said auto-correlation samples and $\Delta\hat{\underline{R}}$ is the matrix of the last determined set of changes to said impulse response coefficients.

8. Apparatus including a control circuit for altering the output signal from a filter network, resulting from an input signal thereto by altering the impulse response of said filter network and so as to conform to another signal, in which said control circuit comprises:

first shiftable storage means for receiving samples of at least one first signal at least related to said input signal;

second shiftable storage means for receiving samples of at least one second signal at least related to said output signal;

third shiftable storage means for storing values of adjustments of said impulse response;

modification means coupling said third storage means to the output of at least said second storage means for repetitively modifying said impulse response adjustment values;

updating means including multiplier means and aggregating means, said updating means being connected from said first and third storage means to said second storage means and repetitively, and in alternation to said repetitive modification of said impulse response adjustment values, applying outputs of said first and third storage means to said multiplier means and aggregating means for producing an aggregation of multiplicands of said first signal samples and stored values of adjustments in said third storage means, said updating means further including difference means connected to the output of said aggregating means and to said second storage means for updating of said second storage means to provide repetitively, and in alternation to said modifying of said impulse response adjustment values, revised values of said second signal samples to provide iterative revision of said impulse response adjustment values before a new set of samples are applied to said first and second storage means whereby, in response to repetitively modified impulse response adjustment values from said third storage means, said output signal of said filter network can be adjusted to conform to said another signal.

9. A self-adaptive filter including a filter network, a control circuit for altering the output signal from the filter network, resulting from an input signal thereto by altering the impulse response of said filter network and so as to conform to another signal, difference means for generating from said output signal and said another signal a difference signal at least representing the difference between said another signal and said output signal, and sampling means for sampling said difference signal and for sampling said input signal to produce difference signal samples and input signal samples, said control circuit comprising:

first shiftable storage means for receiving said input signal samples;

second shiftable storage means for receiving said difference signal samples;

third shiftable storage means for storing values of adjustments of said impulse response;

modification means coupling said third storage means to the output of at least said second storage means for repetitively modifying said impulse response adjustment values;

updating means associated with said second storage means, said updating means including multiplier means and aggregating means and means repetitively, and in alternation to said repetitive modification of said impulse response adjustment values, connecting outputs of said first and third storage means to said multiplier means and aggregating means for producing an aggregation of multiplicands of said first samples and stored values of adjustments in said third storage means, said updating means further including difference means connected to the output of said aggregating means and to said second storage means for updating of said second storage means to provide repetitively, and in alternation to said modifying of said impulse response adjustment values, revised values of said difference signal samples to provide iterative revision of said impulse response adjustment values before a new set of samples are applied to said first and second storage means, whereby, in response to repetitively modified impulse response adjustment values from said third storage means, said output signal of said filter network can be adjusted to conform to said another signal.

10. A self-adaptive filter as claimed in claim 9, wherein said modification means couples said third storage means to outputs of said first and second storage means and includes means connecting said last-mentioned outputs to said multiplier and aggregating means for computing partial derivatives in accordance with the following equation:

$$\begin{matrix} \dfrac{\partial E}{\partial \hat{r}_o} & & x_o & x_1 & \cdots\cdots & x_M & 2y_o \\ \dfrac{\partial E}{\partial \hat{r}_1} & = & x_{-1} & x_o & \cdots\cdots & x_{M-1} & 2y_1 \\ \cdot & & \cdot & \cdot & & \cdot & \cdot \\ \cdot & & \cdot & \cdot & & \cdot & \cdot \\ \cdot & & \cdot & \cdot & & \cdot & \cdot \\ \cdot & & \cdot & \cdot & & \cdot & \cdot \\ \dfrac{\partial E}{\partial \hat{r}_M} & & x_{-M} & x_{-M+1} & & x_o & 2y_M \end{matrix}$$

where $(\delta E/\delta \hat{r}_o)$ .... $(\delta E/\delta \hat{r}_M)$ are the said partial derivatives, $x_o$............$x_M$ are said input signal samples and $y_o$..........$y_M$M, are said difference signal samples, and further includes means for reading the signs of said partial derivatives to provide said impulse response adjustments.

11. A self-adaptive filter as claimed in claim 10, wherein said multiplicands are components of co-efficients of the matrix $\underline{X}.\Delta\hat{\underline{R}}$ where $\underline{X}$ is the matrix of said input signal samples and $\Delta\hat{\underline{R}}$ is the matrix of the last stored impulse response values in said third storage means, said accumulator accumulating components of each co-efficient.

12. A self-adaptive filter including a filter network, a control circuit for altering the output signal from the filter network, resulting from an input signal thereto by altering the impulse response of said filter network and so as to conform to another signal;

difference means for generating, from said another signal and said output signal, a signal at least representing the difference between said another signal and said output signal;

auto-correlation generating means for generating a plurality of first signals representing coefficients of auto-correlation of said input signal, and first sampling means for sampling said second signals to provide a set of auto-correlation samples;

cross-correlation generating means for generating a plurality of second signals representing coefficients of cross-correlation between said difference signal and said input signal, second sampling means for sampling said second signals to provide a set of cross-correlation samples;

said control circuit comprising:

first shiftable storage means for receiving said auto-correlation samples;

second shiftable storage means for receiving said cross-correlation samples;

third shiftable storage means for storing values of adjustments of said impulse response;

modification means coupling said third storage means to the output of at least said second storage means for repetitively modifying said impulse response adjustment values;

updating means for said second storage means, said updating means including multiplier means and aggregating means repetitively, and in alternation to said repetitive modification of said impulse response adjustment values, connecting outputs of said first and third storage means to said multiplier means for producing an aggregation of multiplicands of said auto-correlation samples and stored values of adjustments in said third storage means;

said updating means further including difference means connected to the output of said aggregating means and to said output of said second storage means for updating of said second storage means to provide repetitively, and in alternation to said modifying of said impulse response adjustment values revised values of said auto-correlation samples to provide iterative revision of said impulse response adjustment values before a new set of samples are applied to said first and second storage means whereby, in response to repetitively modified impulse response adjustment values from said third storage means, said output signal of said filter network can be adjusted to conform to said another signal.

13. A self-adaptive filter as claimed in claim 12, wherein said multiplicands are components of co-efficients of the matrix product $\underset{\sim}{A}.\Delta\underset{\sim}{R}$ where $\underset{\sim}{A}$ is the matrix of said auto-correlation samples and $\Delta\underset{\sim}{R}$ is the matrix of the last stored impulse response adjustment values in said third store and said components being accumulated in said aggregating means.

14. A self-adaptive filter as claimed in claim 13, wherein said modification means comprises means for determining the signs of samples in said second storage means whereby said repetitive modification to said impulse response adjustment values is in accordance with said signs.

15. A self-adaptive filter including a filter network having a plurality of impulse response coefficient establishing means, a control circuit for computing an alteration to the filter network impulse response, the alteration being an alteration of the filter network impulse response coefficients to alter an output signal of the filter network, resulting from application of an input signal thereto, in a manner tending to conform the output signal to another signal and difference means for generating an electrical difference signal representing the difference between said output signal and said another signal; said control circuit comprising:

sampling means for providing a series of time-spaced electrical signal first samples representing said input signal, and a set of time-spaced electrical signal second samples representing said difference signal;

first storage means coupled to said sampling means for storing said first samples;

second storage means coupled to said sampling means for receiving and storing said set of second samples and for receiving and storing subsequent sets of modified second samples;

first output means associated with the first storage means for repeatedly delivering, from said first storage means, first storage output signals corresponding to said first samples;

second output means associated with said second storage means for repeatedly delivering, from said second storage means, second storage output signals corresponding to samples of that one of said set of second samples and sets of modified second samples then stored therein;

first computing means connected to said first and second storage means and responsive to output signals of said first and second storage means for computing successive sets of gradient signals comprising a first set of gradient signals representing partial derivatives of said coefficients of impulse response with respect to said difference signal, and successive further sets representing partial derivatives of said coefficients of impulse response with respect to successive modified difference signals represented by successive ones of said sets of modified second samples;

increment means coupled to said first computing means for obtaining from each set of gradient signals, a separate set of increment signals determined at least in accordance with the signs of corresponding ones of that set of gradient signals;

third storage means for sequentially storing said sets of increment signals;

first coupling means coupling said third storage means and increment means for passing said sets of increment signals to said third storage means, for storage;

second coupling means associated with said third storage means and coupled to said impulse response coefficient establishing means and operable to increment the coefficients of impulse response in accordance with each successive set of increment signals whereby successive incrementations of said impulse response coefficients comprise said alteration; and third output means coupled to said third storage means for repeatedly delivering, from said third storage means, third storage output signals corresponding to signals of that one of said set of increment signals then stored in said third storage means;

second computing means connected to said second and third storage means and responsive to output signals thereof for computing sets of electrical difference signal modification signals comprising a first set representing estimated modifications of said difference signal samples occurring as a result of incrementing of said impulse response coefficients in accordance with the first of said sets of increment signals and successive further sets each representing estimated modifications of the last stored set of modified difference signal samples occurring as a result of incrementing of said impulse response coefficients in accordance with a last stored set of increment signals in said third storage means;

second sample modification means coupled between said second computing means and said second storage means to modify said second samples in said second storage means in accordance with said first set of difference signal modification signals and to modify each successively stored set of modified difference signal samples in said second storage means in accordance with a corresponding one of said further sets of difference signal modification signals.

16. A self-adaptive filter as claimed in claim 15, wherein said plurality of impulse response coefficient establishing means comprises fourth storage means for storing said impulse response coefficients as impulse response coefficient signals, said fourth storage means having coupled thereto fourth output means operable to repeatedly deliver, from said fourth storage means, fourth storage output signals corresponding to said impulse response coefficient signals, said second coupling means being connected to said third and fourth output means to receive said third and fourth storage output signals and comprising additive circuit means operable to successively modify said impulse response coefficients signals in accordance with corresponding ones of increment signals of each said set of increment signals, and to pass these to the fourth storage means to replace the impulse response coefficient signals previously stored.

17. A self-adaptive filter as claimed in claim 16, wherein said filter network further comprises fifth storage means;

input means associated with said fifth storage means and operable to pass, into said fifth storage means, said first samples;

fifth output means associated with said fifth storage means and operable to repeatedly deliver, from said fifth storage means, electrical signals corresponding to said first samples;

third coupling means coupling said fourth and fifth output means to third computing means;

said third computing means including multiplier and accumulator means operable to generate electrical signals, representing said output signal.

18. A self-adaptive filter as claimed in claim 15, wherein said first computing means comprises multiplier means and accumulator means operable to compute each said set of gradient signals in accordance with the following equation:

$$
\begin{array}{llllll}
\frac{\partial E}{\partial \hat{r}_0} & x_0 & x_1 & \cdots\cdots & x_M & 2y_0 \\
\frac{\partial E}{\partial \hat{r}_1} = & x_{-1} & x_0 & \cdots\cdots & x_{M-1} & 2y_1 \\
\vdots & \vdots & \vdots & & \vdots & \vdots \\
\frac{\partial E}{\partial \hat{r}_M} & x_{-M} & x_{-M+1} & & x_0 & 2y_M
\end{array}
$$

where $(\delta E/\delta \hat{r}_o)$ ... $(\delta E/\delta \hat{r}_M)$ are the gradient signals of each said set of gradient signals and $x_o$......$x_M$ are said first samples and $y_o$.......$y_M$ are the last stored set of samples in said second storage means.

19. A self-adaptive filter as claimed in claim 17, wherein said second computing means comprises multiplier means and accumulator means operable to generate each said difference signal modification signal as a product $\underline{x}.\Delta\underline{\hat{r}}$ where $\underline{x}$ is the matrix of said first samples and $\Delta\underline{\hat{r}}$ is the matrix consisting of the last stored set of increment signals in said third storage means.

20. A self-adaptive filter as claimed in claim 19, wherein said second sample modification means comprises a subtractor.

21. A self-adaptive filter as claimed in claim 19, wherein said first and second computing means include a common multiplier and and accumulator and further include switch means for selective coupling thereto of the first and second storage output signals or the first and third storage output signals.

22. A self-adaptive filter including a filter network having a plurality of impulse response coefficient establishing means;

a control circuit for computing an alteration to the filter network impulse response, the alteration being an alteration of the filter network impulse response coefficients to alter an output signal of the filter network, resulting from application of an input signal thereto, in a manner tending to conform the output signal to another signal and difference means for generating an electrical difference signal representing the difference between said output signal and said another signal; said control circuit comprising:

auto-correlation generating means for computing coefficients of auto-correlation of said input signal;

first sampling means for providing a series of time-spaced electrical signal first samples representing said auto-correlation coefficients;

first storage means coupled to said first sampling means for receiving and storing said first samples;

cross-correlation coefficient generating means for computing coefficients of cross-correlation between said another signal and said difference signal;

second sampling means for providing a set of time-spaced electrical signal second samples of said cross-correlation coefficients;

second storage means coupled to said second sampling means for receiving and storing said set of second samples, and for receiving and storing subsequent sets of modified second samples;

third storage means;

second storage output and coupling means coupling said second storage means to said third storage means to store in said third storage means sets of increment signals comprising a first set determined in accordance with the signs of corresponding ones of said second samples and further sets each determined in accordance with the signs of corresponding ones of modified second samples of a separate one of said subsequent sets;

first coupling means coupling said third storage means to said filter network and operable to increment the impulse response coefficient establishing means in accordance with said increment signals of each said set of increment signals whereby successive incrementations comprise said alteration;

first storage output means associated with the first storage means for repeatedly delivering from said first storage means first storage output signals corresponding to said first samples;

third storage output means associated with the said third storage means for repeatedly delivering, from said third storage means, third storage output signals corresponding to signals of that one of said sets of increment signals then stored in said third storage means;

third coupling means operable to couple said first and third storage output means and to deliver said first and third storage output signals;

computing means connected to said third coupling means and responsive to said first and third storage output signals to compute sets of second sample modification signals comprising a first set representing estimated modifications to said set of second samples occurring as a result of said incrementation of impulse response coefficients in accordance with said first set of increment signals and subsequent sets each representing estimated modifications to the last stored set of modified second samples stored in said second storage means occurring as a result of an incrementation of impulse response coefficients in accordance with a corresponding last determined one of said further sets of increment signals;

second sample modification means coupled between said computing means and said second storage means and operable to modify said set of second samples in said second storage means in accordance with the second sample modification signals and to modify each said further set of modified second samples in accordance with the last computed one of said subsequent sets of second sample modification signals.

23. A self-adaptive filter as claimed in claim 22, wherein said computing means comprises a multiplier and an accumulator operable to generate each said set of second sample modification signals as the product $\underline{A}.\Delta\underline{\hat{R}}$ where $\underline{A}$ is the matrix of first samples and $\Delta\underline{\hat{R}}$ is the matrix of the last determined set of increment signals, said second sample modification means comprising a subtractive network.

24. A self-adaptive filter as claimed in claim 23, wherein said filter network includes a delay line operable to generate from said input signal a plurality of time-spaced delay line signals corresponding thereto, said impulse response coefficient establishing means comprising a plurality of multipliers coupled to said delay line, and operable to multiply respective ones of said delay line signals by signals held therein representing the impulse response coefficients, the filter network further including summation means coupled to said multipliers to sum the outputs thereof to provide said output signal.

25. A self-adaptive filter as claimed in claim 24, wherein said auto-correlation computing means and said cross-correlation computing means are each coupled to said delay line to receive said delay line signals.

* * * * *

UNITED STATES PATENT OFFICE
CERTIFICATE OF CORRECTION

Patent No. 3 732 410 Dated May 8, 1973

Inventor(s) Laurence Kenneth Mackechnie

It is certified that error appears in the above-identified patent and that said Letters Patent are hereby corrected as shown below:

Column 4, lines 46-55; cancel the mathematical expression and substitute the following:

$$\begin{bmatrix} \varepsilon_0 \\ \cdot\cdot \\ \cdot \\ \cdot \\ \cdot \\ \varepsilon_M \end{bmatrix} = \begin{bmatrix} f_0 \\ \cdot \\ \cdot \\ \cdot \\ \cdot \\ f_M \end{bmatrix} - \begin{bmatrix} g_0 & g_{-1} & g_{-2}\ldots & g_{-M} \\ g_1 & g_0 & g_{-1}\ldots & g_{-M+1} \\ \cdot & & & \cdot \\ \cdot & & & \cdot \\ \cdot & & & \cdot \\ g_M & g_{M-1}\ldots & \ldots & g_0 \end{bmatrix} \begin{bmatrix} w_0 \\ \cdot \\ \cdot \\ \cdot \\ \cdot \\ w_M \end{bmatrix} \quad 2.$$

Column 7, lines 55 to the end of the column; cancel the mathematical expression and substitute the following:

UNITED STATES PATENT OFFICE

CERTIFICATE OF CORRECTION

Patent No. 3 732 410 Dated May 8, 1973

Inventor(s) Laurence Kenneth Mackechnie

It is certified that error appears in the above-identified patent and that said Letters Patent are hereby corrected as shown below:

$$\begin{bmatrix} \frac{\partial E}{\partial \hat{r}_o} \\ \frac{\partial E}{\partial \hat{r}_1} \\ \cdot \\ \cdot \\ \cdot \\ \cdot \\ \frac{\partial E}{\partial \hat{r}_M} \end{bmatrix} = \begin{bmatrix} x_o & x_1 & \cdots\cdots & x_M \\ x_{-1} & x_o & \cdots\cdots & x_{M-1} \\ \cdot & \cdot & & \cdot \\ \cdot & \cdot & & \cdot \\ \cdot & \cdot & & \cdot \\ \cdot & \cdot & & \cdot \\ x_{-M} & x_{-M+1} & & x_o \end{bmatrix} \begin{bmatrix} 2y_o \\ 2y_1 \\ \cdot \\ \cdot \\ \cdot \\ \cdot \\ 2y_M \end{bmatrix} \cdot \qquad (6)$$

Column 8, line 16; cancel and substitute the following expression:

---i.e. $y'_k = y_k - \sum_{n=o}^{M} x_{k-n} \Delta \hat{r}_n$---.

FORM PO-1050 (10-69)

USCOMM-DC 60376-P69
☆ U.S. GOVERNMENT PRINTING OFFICE : 1969 O—366-334.

UNITED STATES PATENT OFFICE
CERTIFICATE OF CORRECTION

Patent No. 3 732 410 Dated May 8, 1973

Inventor(s) Laurence Kenneth Mackechnie

It is certified that error appears in the above-identified patent and that said Letters Patent are hereby corrected as shown below:

Column 10, line 21; cancel and substitute the following:

---i.e. $C'_k = C_k - \sum_{n=o}^{M} A_{k-n} \cdot \Delta\hat{r}_n$ 7(c)---.

Column 13, lines 66-69 continued Column 14, lines 1-12; please cancel the mathematical expression and substitute the following:

$$-\begin{bmatrix} \frac{\partial E}{\partial \hat{r}_o} \\ \frac{\partial E}{\partial \hat{r}_1} \\ \cdot \\ \cdot \\ \cdot \\ \cdot \\ \frac{\partial E}{\partial \hat{r}_M} \end{bmatrix} = \begin{bmatrix} x_o & x_1 & \cdots\cdots & x_M \\ x_{-1} & x_o & \cdots\cdots & x_{M-1} \\ \cdot & \cdot & & \cdot \\ \cdot & \cdot & & \cdot \\ \cdot & \cdot & & \cdot \\ \cdot & \cdot & & \cdot \\ x_{-M} & x_{-M+1} & & x_o \end{bmatrix} \begin{bmatrix} 2y_o \\ 2y_1 \\ \cdot \\ \cdot \\ \cdot \\ \cdot \\ 2y_M \end{bmatrix}$$

UNITED STATES PATENT OFFICE

CERTIFICATE OF CORRECTION

Patent No. 3 732 410 Dated May 8, 1973

Inventor(s) Laurence Kenneth Mackechnie

It is certified that error appears in the above-identified patent and that said Letters Patent are hereby corrected as shown below:

Column 16, lines 30-44; cancel the mathematical expression and substitute the following:

$$-\begin{bmatrix} \frac{\partial E}{\partial \hat{r}_o} \\ \frac{\partial E}{\partial \hat{r}_1} \\ \cdot \\ \cdot \\ \cdot \\ \cdot \\ \frac{\partial E}{\partial \hat{r}_M} \end{bmatrix} = \begin{bmatrix} x_o & x_1 & \cdots\cdots & x_M \\ x_{-1} & x_o & \cdots\cdots & x_{M-1} \\ \cdot & \cdot & & \cdot \\ \cdot & \cdot & & \cdot \\ \cdot & \cdot & & \cdot \\ \cdot & \cdot & & \cdot \\ x_{-M} & x_{-M+1} & & x_o \end{bmatrix} \begin{bmatrix} 2y_o \\ 2y_1 \\ \cdot \\ \cdot \\ \cdot \\ \cdot \\ 2y_M \end{bmatrix}$$

Column 19, lines 64-67 continued Column 20, lines 1-11; please cancel the mathematical expression and substitute the following:

UNITED STATES PATENT OFFICE

CERTIFICATE OF CORRECTION

Patent No. 3 732 410 Dated May 8, 1973

Inventor(s) Laurence Kenneth Mackechnie

It is certified that error appears in the above-identified patent and that said Letters Patent are hereby corrected as shown below:

$$-\begin{bmatrix} \frac{\partial E}{\partial \hat{r}_o} \\ \frac{\partial E}{\partial \hat{r}_1} \\ \cdot \\ \cdot \\ \cdot \\ \cdot \\ \frac{\partial E}{\partial \hat{r}_M} \end{bmatrix} = \begin{bmatrix} x_o & x_1 & \cdots\cdots & x_M \\ x_{-1} & x_o & \cdots\cdots & x_{M-1} \\ \cdot & \cdot & & \cdot \\ \cdot & \cdot & & \cdot \\ \cdot & \cdot & & \cdot \\ \cdot & \cdot & & \cdot \\ x_{-M} & x_{-M+1} & & x_o \end{bmatrix} \begin{bmatrix} 2y_o \\ 2y_1 \\ \cdot \\ \cdot \\ \cdot \\ \cdot \\ 2y_M \end{bmatrix}$$

Signed and sealed this 9th day of April 1974.

(SEAL)
Attest:

EDWARD M.FLETCHER,JR.
Attesting Officer

C. MARSHALL DANN
Commissioner of Patents

USCOMM-DC 60376-P69
U.S. GOVERNMENT PRINTING OFFICE : 1969 0—366-334.

6